(12) United States Patent
Ritchie et al.

(10) Patent No.: US 6,715,473 B2
(45) Date of Patent: Apr. 6, 2004

(54) EGR EQUIPPED DIESEL ENGINES AND LUBRICATING OIL COMPOSITIONS

(75) Inventors: Andrew J. D. Ritchie, Chatham, NJ (US); Jai G. Bansal, Westfield, NJ (US); Jacob Emert, Brooklyn, NY (US); Glen P. Fetterman, Morris Plaines, NJ (US); Antonio Gutierrez, Mercerville, NJ (US); Matthew D. Irving, Fairford (GB); Christopher J. Locke, Wantage (GB); Michael T. Minotti, Summit, NJ (US)

(73) Assignee: Infineum International Ltd. (GB)

( * ) Notice: Subject to any disclaimer, the term of this patent is extended or adjusted under 35 U.S.C. 154(b) by 57 days.

(21) Appl. No.: 10/209,522

(22) Filed: Jul. 30, 2002

(65) Prior Publication Data

US 2004/0025853 A1 Feb. 12, 2004

(51) Int. Cl.$^7$ .................. F02M 25/07; C11D 1/00; F01M 11/00
(52) U.S. Cl. ............... 123/568.12; 123/196 R; 510/184
(58) Field of Search ........... 123/568.11, 568.12, 123/568.21, 568.22, 196 R; 701/102, 103, 108; 508/391, 467, 468, 507, 508, 543, 579, 591; 525/280, 294, 301, 351; 510/184; 585/7, 10, 11, 12

(56) References Cited

U.S. PATENT DOCUMENTS

| | | | | |
|---|---|---|---|---|
| 4,073,737 | A | * 2/1978 | Elliott | 508/467 |
| 4,427,834 | A | * 1/1984 | Martin | 525/280 |
| 4,620,048 | A | * 10/1986 | Ver Strate et al. | 585/10 |
| 4,970,009 | A | * 11/1990 | Van Zon et al. | 508/508 |
| 6,153,565 | A | * 11/2000 | Skinner et al. | 508/391 |
| 6,281,179 | B1 | * 8/2001 | Skinner et al. | 510/184 |
| 6,301,887 | B1 | * 10/2001 | Gorel et al. | 60/605.2 |
| 6,303,550 | B1 | * 10/2001 | Wedlock et al. | 508/591 |
| 6,429,178 | B1 | * 8/2002 | Skinner et al. | 510/184 |
| 6,429,179 | B1 | * 8/2002 | Skinner et al. | 510/184 |
| 2002/0189256 | A1 | * 12/2002 | Kalish | 60/605.2 |
| 2003/0114978 | A1 | * 6/2003 | Rimnac et al. | 701/108 |

* cited by examiner

Primary Examiner—Willis R. Wolfe

(57) ABSTRACT

Soot induced kinematic viscosity increase of lubricating oil compositions for heavy duty diesel engines equipped with EGR systems operating in a condensing mode can be ameliorated by selection of viscosity modifier, lubricating oil flow improvers, detergents and dispersants.

40 Claims, 1 Drawing Sheet

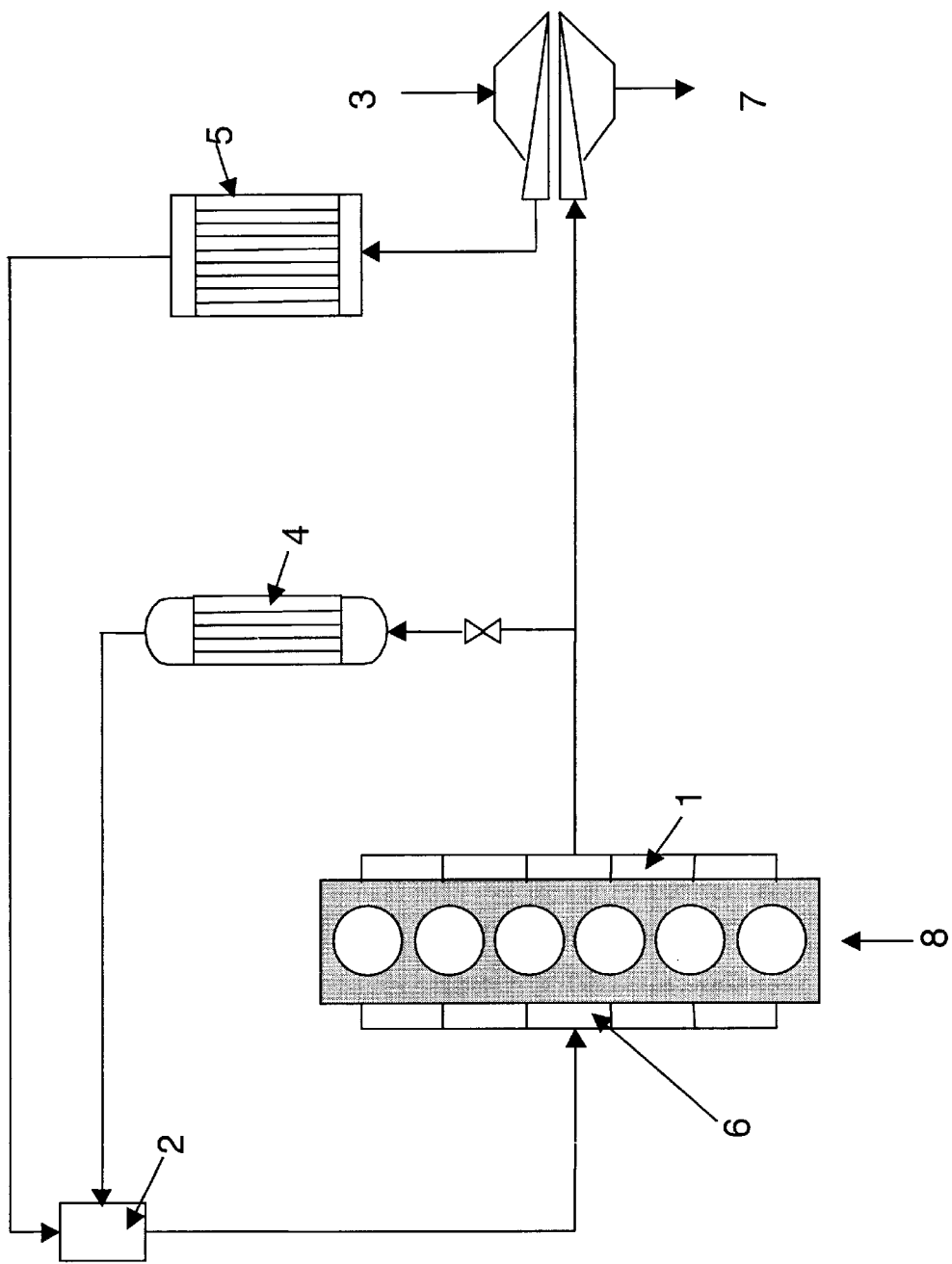

EGR EQUIPPED DIESEL ENGINES AND LUBRICATING OIL COMPOSITIONS

The present invention relates to heavy duty diesel (HDD) engines provided with exhaust gas recirculation (EGR) systems, and lubricating oil compositions providing improved performance in such engines. More particularly, the present invention relates to compression ignited internal combustion engines equipped with EGR systems in which intake air and/or exhaust gas recirculation streams are cooled below the dew point during operation (condensation mode), lubricated with a lubricating oil composition that provides acceptable performance over a drain period of at least 15,000 miles in such an engine.

BACKGROUND OF THE INVENTION

Environmental concerns have led to continued efforts to reduce $NO_x$ emissions of compression ignited (diesel) internal combustion engines. The latest technology being used to reduce the $NO_x$ emissions of heavy duty diesel engines is known as exhaust gas recirculation or EGR. EGR reduces $NO_x$ emissions by introducing non-combustible components (exhaust gas) into the incoming air-fuel charge introduced into the engine combustion chamber. This reduces peak flame temperature and $NO_x$ generation. In addition to the simple dilution effect of the EGR, an even greater reduction in $NO_x$ emission is achieved by cooling the exhaust gas before it is returned to the engine. The cooler intake charge allows better filling of the cylinder, and thus, improved power generation. In addition, because the EGR components have higher specific heat values than the incoming air and fuel mixture, the EGR gas further cools the combustion mixture leading to greater power generation and better fuel economy at a fixed $NO_x$ generation level.

Diesel fuel contains sulfur. Even "low-sulfur" diesel fuel contains 300 to 400 ppm of sulfur. When the fuel is burned in the engine, this sulfur is converted to $SO_x$. In addition, one of the major by-products of the combustion of a hydrocarbon fuel is water vapor. Therefore, the exhaust stream contains some level of $NO_x$, $SO_x$ and water vapor. In the past, the presence of these substances has not been problematic because the exhaust gases remained extremely hot, and these components were exhausted in a dis-associated, gaseous state. However, when the engine is equipped with an EGR, and the EGR stream is cooled before it is returned to the engine, the $NO_x$, $SO_x$, water vapor mixture is cooled below the dew point, causing the water vapor to condense. This water reacts with the $NO_x$ and $SO_x$ components to form a mist of nitric and sulfuric acids in the EGR stream.

In the presence of these acids, it has been found that soot levels in lubricating oil compositions build rapidly, and that under said conditions, the kinematic viscosity (kv) of lubricating oil compositions increase to unacceptable levels, even in the presence of relatively small levels of soot (e.g., 3 wt. % soot). Because increased lubricant viscosity adversely affects performance, and can even cause engine failure, the use of an EGR system that operates in a condensing mode during at least a portion of the operating time, requires frequent lubricant replacement. API-CI-4 oils developed specifically for EGR equipped engines that operate in a condensing mode have been found to be unable to address this problem. It has also been found that simply adding additional dispersant is ineffective.

Therefore, it would be advantageous to identify lubricating oil compositions that better perform in heavy duty diesel engines equipped with EGR systems that operate in a condensing mode. Surprisingly, it has been found that by selecting certain additives, specifically certain viscosity modifiers and/or detergents, the rapid increase in lubricant viscosity associated with the use of engines provided with EGR systems that operate in a condensing mode can be ameliorated.

SUMMARY OF THE INVENTION

In accordance with a first aspect of the invention, there is provided a heavy duty diesel engine provided with an exhaust gas recirculation system in which intake air and/or exhaust gas recirculation streams are cooled to below the dew point for at least 10% of the time said engine is in operation, said engine being lubricated with a lubricating oil composition comprising a major amount of oil of lubricating viscosity, and a minor amount of one or more high molecular weight polymers comprising (i) copolymers of hydrogenated poly(monovinyl aromatic hydrocarbon) and poly (conjugated diene), wherein the hydrogenated poly (monovinyl aromatic hydrocarbon) segment comprises at least about 20 wt. % of the copolymer; (ii) olefin copolymers containing alkyl or aryl amine, or amide groups, nitrogen-containing heterocyclic groups or ester linkages and/or (iii) acrylate or alkylacrylate copolymer derivatives having dispersing groups.

In accordance with a second aspect of the invention, there is provided an engine, as described in the first aspect, wherein the lubricating oil composition further comprises a minor amount of one or more neutral and/or overbased metal-containing detergents, wherein from about 50% to 100% of the one or more detergents are phenate and/or salicylate detergents.

In accordance with a third aspect of the invention, there is provided a heavy duty diesel engine provided with an exhaust gas recirculation system in which intake air and/or exhaust gas recirculation streams are cooled to below the dew point for at least 10% of the time said engine is in operation, said engine being lubricated with a lubricating oil composition comprising a major amount of oil of lubricating viscosity, and a minor amount of one or more neutral and/or overbased metal-containing detergents, wherein from about 50% to 100% of the one or more detergents are phenate and/or salicylate detergents.

In accordance with a fourth aspect of the invention, there is provided an engine, as described in the third aspect, wherein the lubricating oil composition further comprises a minor amount of one or more high molecular weight polymers comprising (i) copolymers of hydrogenated poly (monovinyl aromatic hydrocarbon) and poly (conjugated diene), wherein the hydrogenated poly(monovinyl aromatic hydrocarbon) segment comprises at least about 20 wt. % of the copolymer; (ii) olefin copolymers containing alkyl or aryl amine, or amide groups, nitrogen-containing heterocyclic groups or ester linkages and/or (iii) acrylate or alkylacrylate copolymer derivatives having dispersing groups.

In accordance with a fifth aspect of the invention, there is provided a heavy duty diesel engine provided with an exhaust gas recirculation system in which intake air and/or exhaust gas recirculation streams are cooled to below the dew point for at least 10% of the time said engine is in operation, said engine being lubricated with a lubricating oil composition comprising a major amount of oil of lubricating viscosity, and a minor amount of one or more nitrogen-containing dispersants wherein greater than 50 wt. % of the dispersant nitrogen is non-basic.

In accordance with a sixth aspect of the invention, there is provided a method of operating a heavy duty diesel engine provided with an exhaust gas recirculation system in which intake air and/or exhaust gas recirculation streams are cooled to below the dew point for at least 10% of the time said engine is in operation, for at least 15,000 without a change of lubricating oil, which method comprises lubricating said engine with a lubricating oil composition comprising a major amount of oil of lubricating viscosity, and a minor amount of one or more high molecular weight polymers comprising (i) copolymers of hydrogenated poly (monovinyl aromatic hydrocarbon) and poly (conjugated diene), wherein the hydrogenated poly(monovinyl aromatic hydrocarbon) segment comprises at least about 20 wt. % of the copolymer; (ii) olefin copolymers containing alkyl or aryl amine, or amide groups, nitrogen-containing heterocylclic groups or ester linkages and/or (iii) acrylate or alkylacrylate copolymer derivatives having dispersing groups.

In accordance with a seventh aspect of the invention, there is provided a method, as in the sixth aspect, wherein the lubricating oil composition further comprises a minor amount of one or more neutral and/overbased metal-containing detergents, wherein from about 50% to 100% of the one or more detergents are phenate and/or salicylate detergents.

In accordance with a eighth aspect of the invention, there is provided a method of operating a heavy duty diesel engine provided with an exhaust gas recirculation system in which intake air and/or exhaust gas recirculation streams are cooled to below the dew point for at least 10% of the time said engine is in operation, for at least 15,000 without a change of lubricating oil, which method comprises lubricating said engine with a lubricating oil composition comprising a major amount of oil of lubricating viscosity, and a minor amount of one or more neutral and/overbased metal-containing detergents, wherein from about 50% to 100% of the one or more detergents are phenate and/or salicylate detergents.

In accordance with a ninth aspect of the invention, there is provided a method, as in the eighth aspect, wherein the lubricating oil composition further comprises a minor amount of one or more high molecular weight polymers comprising (i) copolymers of hydrogenated poly(monovinyl aromatic hydrocarbon) and poly (conjugated diene), wherein the hydrogenated poly(monovinyl aromatic hydrocarbon) segment comprises at least about 20 wt. % of the copolymer; (ii) olefin copolymers containing alkyl or aryl amine, or amide groups, nitrogen-containing heterocylclic groups or ester linkages and/or (iii) acrylate or alkylacrylate copolymer derivatives having dispersing groups.

In accordance with a tenth aspect of the invention, there is provided a method of operating a heavy duty diesel engine provided with an exhaust gas recirculation system in which intake air and/or exhaust gas recirculation streams are cooled to below the dew point for at least 10% of the time said engine is in operation, for at least 15,000 without a change of lubricating oil, which method comprises lubricating said engine with a lubricating oil composition comprising a major amount of oil of lubricating viscosity, and a minor amount of one or more nitrogen-containing dispersants wherein greater than 50 wt. % of the dispersant nitrogen is non-basic.

Other and further objects, advantages and features of the present invention will be understood by reference to the following specification.

BRIEF DESCRIPTION OF THE DRAWINGS

FIG. 1 shows diagrammatically the operation of a heavy duty diesel engine provided with an exhaust gas recirculation system that is optionally operated in a condensing mode in which intake air and/or exhaust gas recirculation streams are cooled to below the dew point.

DETAILED DESCRIPTION OF THE INVENTION

The operation of EGR equipped heavy duty diesel engines is best described with reference to FIG. 1. In such an engine, a portion of the exhaust gas is directed from the exhaust manifold 1 of engine 8 to EGR mixer 2, in which the portion of the exhaust gas routed to the EGR system is mixed with combustion air provided through air inlet 3 to form an air/exhaust gas mixture. Preferably, the portion of exhaust gas and the combustion air are cooled in an EGR cooler 4 and aftercooler 5, respectively, before being mixed. Most preferably, the portion of the exhaust gas routed to the EGR system and/or the intake air will be cooled to a degree such that the air/exhaust gas mixture exiting EGR mixer 2 is below the dew point for at least 10% of the time the engine is operated. The air/exhaust gas mixture is fed to the intake manifold 6 of engine 8, mixed with fuel and combusted. Exhaust not routed to the EGR system is exhausted through exhaust outlet 7. When lubricated with a lubricating oil composition of the present invention, such an engine can be operated over at least about 15,000, preferably at least about 20,000, more preferably from about 20,000 to about 40,000 miles, without a required lubricating oil change.

The oils of lubricating viscosity useful in the practice of the invention may range in viscosity from light distillate mineral oils to heavy lubricating oils such as gasoline engine oils, mineral lubricating oils and heavy duty diesel oils. Generally, the viscosity of the oil ranges from about 2 $mm^2/sec$ (centistokes) to about 40 $mm^2/sec$, especially from about 3 $mm^2/sec$ to about 20 $mm^2/sec$, most preferably from about 4 $mm^2/sec$ to about 10 $mm^2/sec$, as measured at 100° C.

Natural oils include animal oils and vegetable oils (e.g., castor oil, lard oil); liquid petroleum oils and hydrorefined, solvent-treated or acid-treated mineral oils of the paraffinic, naphthenic and mixed paraffinic-naphthenic types. Oils of lubricating viscosity derived from coal or shale also serve as useful base oils.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly (1-decenes)); alkylbenzenes (e.g., dodecylbenzenes, tetradecylbenzenes, dinonylbenzenes, di(2-ethylhexyl) benzenes); polyphenyls (e.g., biphenyls, terphenyls, alkylated polyphenols); and alkylated diphenyl ethers and alkylated diphenyl sulfides and derivative, analogs and homologs thereof.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, and the alkyl and aryl ethers of polyoxyalkylene polymers (e.g., methyl-polyiso-propylene glycol ether having a molecular weight of 1000 or diphenyl ether of poly-ethylene glycol having a molecular weight of 1000 to 1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of such esters includes dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol esters such as neopentyl glycol, trimethylolpropane, pentaerythritol, dipentaerythritol and tripentaerythritol.

Silicon-based oils such as the polyalkyl-, polyaryl-, polyalkoxy- or polyaryloxysilicone oils and silicate oils comprise another useful class of synthetic lubricants; such oils include tetraethyl silicate, tetraisopropyl silicate, tetra-(2-ethylhexyl)silicate, tetra-(4-methyl-2-ethylhexyl)silicate, tetra-(p-tert-butyl-phenyl) silicate, hexa-(4-methyl-2-ethylhexyl)disiloxane, poly(methyl)siloxanes and poly (methylphenyl)siloxanes. Other synthetic lubricating oils include liquid esters of phosphorous-containing acids (e.g., tricresyl phosphate, trioctyl phosphate, diethyl ester of decylphosphonic acid) and polymeric tetrahydrofurans.

Unrefined, refined and re-refined oils can be used in lubricants of the present invention. Unrefined oils are those obtained directly from a natural or synthetic source without further purification treatment. For example, a shale oil obtained directly from retorting operations; petroleum oil obtained directly from distillation; or ester oil obtained directly from an esterification and used without further treatment would be an unrefined oil. Refined oils are similar to unrefined oils except that the oil is further treated in one or more purification steps to improve one or more properties. Many such purification techniques, such as distillation, solvent extraction, acid or base extraction, filtration and percolation are known to those skilled in the art. Re-refined oils are obtained by processes similar to those used to provide refined oils but begin with oil that has already been used in service. Such re-refined oils are also known as reclaimed or reprocessed oils and are often subjected to additionally processing using techniques for removing spent additives and oil breakdown products.

The oil of lubricating viscosity may comprise a Group I, Group II, Group III, Group IV or Group V base stocks or base oil blends of the aforementioned base stocks. Preferably, the oil of lubricating viscosity is a Group II, Group III, Group IV or Group V base stock, or a mixture thereof, or a mixture of a Group I base stock and one or more a Group II, Group III, Group IV or Group V base stock. The base stock, or base stock blend preferably has a saturate content of at least 65%, more preferably at least 75%, most preferably at least 85%. Preferably, the oil or oil blend will have a sulfur content of less than 1%, preferably less than 0.6%, most preferably less than 0.3%, by weight.

Preferably the volatility of the oil or oil blend, as measured by the NOACK test (ASTM D5880), is less than or equal to 30%, preferably less than or equal to 25%, more preferably less than or equal to 20%, most preferably less than or equal 16%. Preferably, the viscosity index (VI) of the oil or oil blend is at least 85, preferably at least 100, most preferably from about 105 to 140.

Definitions for the base stocks and base oils in this invention are the same as those found in the American Petroleum Institute (API) publication "Engine Oil Licensing and Certification System", Industry Services Department, Fourteenth Edition, December 1996, Addendum 1, December 1998. Said publication categorizes base stocks as follows:

a) Group I base stocks contain less than 90 percent saturates and/or greater than 0.03 percent sulfur and have a viscosity index greater than or equal to 80 and less than 120 using the test methods specified in Table 1.

b) Group II base stocks contain greater than or equal to 90 percent saturates and less than or equal to 0.03 percent sulfur and have a viscosity index greater than or equal to 80 and less than 120 using the test methods specified in Table 1.

c) Group III base stocks contain greater than or equal to 90 percent saturates and less than or equal to 0.03 percent sulfur and have a viscosity index greater than or equal to 120 using the test methods specified in Table 1.

d) Group IV base stocks are polyalphaolefins (PAO).

e) Group V base stocks include all other base stocks not included in Group I, II, III, or IV.

TABLE 1

Analytical Methods for Base Stock

| Property | Test Method |
| --- | --- |
| Saturates | ASTM D 2007 |
| Viscosity Index | ASTM D 2270 |
| Sulfur | ASTM D 2622 |
|  | ASTM D 4294 |
|  | ASTM D 4927 |
|  | ASTM D 3120 |

The viscosity index of the base stock is increased, or improved, by incorporating therein certain polymeric materials that function as viscosity modifiers (VM) or viscosity index improvers (VII). Generally, polymeric materials useful as viscosity modifiers are those having number average molecular weights (Mn) of from about 5,000 to about 250,000, preferably from about 15,000 to about 200,000, more preferably from about 20,000 to about 150,000. These viscosity modifiers can be grafted with grafting materials such as, for example, maleic anhydride, and the grafted material can be reacted with, for example, amines, amides, nitrogen-containing heterocyclic compounds or alcohol, to form multifunctional viscosity modifiers (dispersant-viscosity modifiers).

Pour point depressants (PPD), otherwise known as lube oil flow improvers (LOFIs) lower the temperature. Compared to VM, LOFIs generally have a lower number average molecular weight. Like VM, LOFIs can be grafted with grafting materials such as, for example, maleic anhydride, and the grafted material can be reacted with, for example, amines, amides, nitrogen-containing heterocyclic compounds or alcohol, to form multifunctional additives.

Polymer molecular weight, specifically $\overline{M}_n$, can be determined by various known techniques. One convenient method is gel permeation chromatography (GPC), which additionally provides molecular weight distribution information (see W. W. Yau, J. J. Kirkland and D. D. Bly, "Modern Size Exclusion Liquid Chromatography", John Wiley and Sons, New York, 1979). Another useful method for determining molecular weight, particularly for lower molecular weight polymers, is vapor pressure osmometry (see, e.g., ASTM D3592).

One class of polymers that can be used as the "high molecular polymer" of the present invention is copolymers of hydrogenated poly(monovinyl aromatic hydrocarbon) and poly (conjugated diene), wherein the hydrogenated poly(monovinyl aromatic hydrocarbon) segment comprises at least about 20 wt. % of the copolymer (hereinafter "Polymer (i)"). Such polymers can be used in lubricating oil compositions as viscosity modifiers and are commercially available as, for example, SV151 (Infineum USA L.P.). Preferred monovinyl aromatic hydrocarbon monomers useful in the formation of such materials include styrene, alkyl-substituted styrene, alkoxy-substituted styrene, vinyl naphthalene and alkyl-substituted vinyl naphthalene. The alkyl and alkoxy substituents may typically comprise from 1 to 6 carbon atoms, preferably from 1 to 4 carbon atoms. The number of alkyl or alkoxy substituents per molecule, if present, may range from 1 to 3, and is preferably one.

Preferred conjugated diene monomers useful in the formation of such materials include those conjugated dienes containing from 4 to 24 carbon atoms, such as 1,3-butadiene, isoprene, piperylene, methylpentadiene, 2-phenyl-1,3-butadiene, 3,4-dimethyl-1,3-hexadiene and 4,5-diethyl-1,3-octadiene.

Preferred are block copolymers comprising at least one poly(monovinyl aromatic hydrocarbon) block and at least one poly (conjugated diene) block. Preferred block copolymers are selected from those of the formula AB, wherein A represents a block polymer of predominantly poly (monovinyl aromatic hydrocarbon), B represents a block of predominantly poly (conjugated diene).

Preferably, the poly(conjugated diene) block is partially or fully hydrogenated. More preferably, the monovinyl aromatic hydrocarbons are styrene and/or alkyl-substituted styrene, particularly styrene. Preferred conjugated dienes are those containing from 4 to 12 carbon atoms, more preferably from 4 to 6 carbon atoms. Isoprene and butadiene are the most preferred conjugated diene monomers. Preferably, the poly(isoprene) is hydrogenated.

Block copolymers and selectively hydrogenated block copolymers are known in the art and are commercially available. Such block copolymers can be made can be made by anionic polymerization with an alkali metal initiator such as sec-butyllithium, as described, for example, in U.S. Pat. Nos. 4,764,572; 3,231,635; 3,700,633 and 5,194,530.

The poly(conjugated diene) block(s) of the block copolymer may be selectively hydrogenated, typically to a degree such that the residual ethylenic unsaturation of the block is reduced to at most 20%, more preferably at most 5%, most preferably at most 2% of the unsaturation level before hydrogenation. The hydrogenation of these copolymers may be carried out using a variety of well established processes including hydrogenation in the presence of such catalysts as Raney Nickel, noble metals such as platinum and the like, soluble transition metal catalysts and titanium catalysts as described in U.S. Pat. No. 5,299,464.

Sequential polymerization or reaction with divalent coupling agents can be used to form linear polymers. It is also known that a coupling agent can be formed in-situ by the polymerization of a monomer having two separately polymerizable vinyl groups such a divinylbenzene to provide star polymers having from about 6 to about 50 arms. Di- and multivalent coupling agents containing 2 to 8 functional groups, and methods of forming star polymers are well known and such materials are available commercially.

A second class of polymers useful in the practice of the present invention are olefin copolymers (OCP) containing dispersing groups such as alkyl or aryl amine, or amide groups, nitrogen-containing heterocyclic groups or ester linkages (hereinafter "Polymer (ii)"). The olefin copolymers can comprise any combination of olefin monomers, but are most commonly ethylene and at least one other α-olefin. The at least one other α-olefin monomer is conventionally an α-olefin having 3 to 18 carbon atoms, and is most preferably propylene. As is well known, copolymers of ethylene and higher α-olefins, such as propylene, often include other polymerizable monomers. Typical of these other monomers are non-conjugated dienes such as the following, non-limiting examples a. straight chain dienes such as 1,4-hexadiene and 1,6-octadiene;

b. branched chain acyclic dienes such as 5-methyl-1,4-hexadiene; 3,7-dimethyl-1,6-octadiene; 3,7-dimethyl-1,7-octadiene and mixed isomers of dihydro-mycene and dihydroocinene;

c. single ring alicyclic dienes such as 1,4-cyclohexadiene; 1,5-cyclooctadiene; and 1,5-cyclododecadiene;

d. multi-ring alicyclic fused and bridged ring dienes such as tetrahydroindene; methyltetrahydroindene; dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-propylene-2-norbornene, 5-isoproylidene-2-norbornene, 5-(4-cyclopentyenyl)-2-norbornene; 5-cyclohexylidene-2-norbornene.

Of the non-conjugated dienes typically used, dienes containing at least one of the double bonds in a strained ring are preferred. The most preferred diene is 5-ethylidene-2-norbornene (ENB). The amount of diene (wt. basis) in the copolymer can be from 0% to about 20%, with 0% to about 15% being preferred, and 0% to about 10% being most preferred. As already noted, the most preferred olefin copolymer is ethylene-propylene. The average ethylene content of the copolymer can be as low as 20% on a weight basis. The preferred minimum ethylene content is about 25%. A more preferred minimum is 30%. The maximum ethylene content can be as high as 90% on a weight bas, preferably the maximum ethylene content is 85%, most preferably about 80%. Preferably, the olefin copolymers contain from about 35 to 75 wt. % ethylene, more preferably from about 50 to about 70 wt. % ethylene.

The molecular weight (number average) of the olefin copolymer can be as low as 2000, but the preferred minimum is 10,000. The more preferred minimum is 15,000, with the most preferred minimum number average molecular weight being 20,000. It is believed that the maximum number average molecular weight can be as high as 12,000,000. The preferred maximum is about 1,000,000, with the most preferred maximum being about 750,000. An especially preferred range of number average molecular weight for the olefin copolymers of the present invention is from about 50,000 to about 500,000.

Olefin copolymers can be rendered multifunctional by attaching a nitrogen-containing polar moiety (e.g., amine, amine-alcohol or amide) to the polymer backbone. The nitrogen-containing moieties are conventionally of the formula R—N—R'R", wherein R, R' and R" are independently alkyl, aryl of H. Also suitable are aromatic amines of the formula R—R'—NH—R"—R, wherein R' and R" are aromatic groups and each are is alkyl. The most common method for forming a multifunctional OCP viscosity modifier involves the free radical addition of the nitrogen-containing polar moiety to the polymer backbone. The nitrogen-containing polar moiety can be attached to the polymer using a double bond within the polymer (i.e., the double bond of the diene portion of an EPDM polymer, or by reacting the polymer with a compound providing a bridging group containing a double bond (e.g., maleic anhydride as described, for example, in U.S. Pat. Nos. 3,316,177; 3,326,804; and carboxylic acids and ketones as described, for example, in U.S. Pat. No. 4,068,056), and subsequently derivatizing the functionalized polymer with the nitrogen-containing polar moiety. A more complete list of nitrogen-containing compounds that can be reacted with the functionalized OCP are described infra, in the discussion of dispersants. Multifunctionalized OCPs and methods for forming such materials are known in the art and are available commercially (e.g., HITEC 5777 available from Ethyl Corporation and PA1160, a product of Dutch Staaten Minen).

Preferred are low ethylene olefin copolymers containing about 50 wt. % ethylene and having a number average molecular weight between 10,000 and 20,000 grafted with maleic anhydride and aminated with aminopheyldiamine and other dispersant amines.

The third class of polymers useful in the practice of the present invention are acrylate or alkylacrylate copolymer derivatives having dispersing groups (hereinafter "Polymer (iii)"). These polymers have been used as multifunctional dispersant viscosity modifiers in lubricating oil compositions, and lower molecular weight polymers of this type have been used as multifunctional dispersant/LOFIs. Such polymers are commercially available as, for example, ACRYLOID 954, (a product of RohMax USA Inc.) The acrylate or methacrylate monomers and alkyl acrylate or methacrylate monomers useful in the formation of Polymer (iii) can be prepared from the corresponding acrylic or methacrylic acids or their derivatives. Such acids can be derived using well known and conventional techniques. For example, acrylic acid can be prepared by acidic hydrolysis and dehydration of ethylene cyanohydrin or by the polymerization of β-propiolactone and the destructive distillation of the polymer to form acrylic acid. Methacrylic acid can be prepared by, for example, oxidizing a methyl α-alkyl vinyl ketone with metal hypochlorites; dehydrating hydroxyisobutyric acid with phosphorus pentoxide; or hydrolyzing acetone cyanohydrin.

Alkyl acrylates or methacrylate monomers can be prepared by reacting the desired primary alcohol with the acrylic acid or methacrylic acid in a conventional esterification catalyzed by acid, preferably p-toluene sulfonic acid and inhibited from polymerization by MEHQ or hydroquinone. Suitable alkyl acrylates or alkyl methacrylates contain from about 1 to about 30 carbon atoms in the alkyl carbon chain. Typical examples of starting alcohols include methyl alcohol, ethyl alcohol, ethyl alcohol, butyl alcohol, octyl alcohol, iso-octyl alcohol, isodecyl alcohol, undecyl alcohol, dodecyl alcohol, tridecyl alcohol, capryl alcohol, lauryl alcohol, myristyl alcohol, pentadecyl alcohol, palmityl alcohol and stearyl alcohol. The starting alcohol can be reacted with acrylic acid or methacrylic acid to form the desired acrylates and methacrylates, respectively. These acrylate polymers may have number average molecular weights (Mn) of 10,000–1,000,000 and preferably the molecular weight range is from about 200,000–600,000.

To provide an acrylate or methacrylate with a dispersing group, the acrylate or methacrylate monomer is copolymerized with an amine-containing monomer or the acrylate or methacrylate main chain polymer is provided so as to contain sights suitable for grafting and then amine-containing branches are grafted onto the main chain by polymerizing amine-containing monomers.

Examples of amine-containing monomers include the basic amino substituted olefins such as p-(2-diethylaminoethyl) styrene; basic nitrogen-containing heterocycles having a polymerizable ethylenically unsaturated substituent such as the vinyl pyridines or the vinyl pyrrolidones; esters of amino alcohols with unsaturated carboxylic acids such as dimethylaminoethyl methacrylate and polymerizable unsaturated basic amines such as allyl amine.

Preferred Polymer (iii) materials include polymethacrylate copolymers made from a blend of alcohols with the average carbon number of the ester between 8 and 12 containing between 0.1–0.4% nitrogen by weight.

Most preferred are polymethacrylate copolymers made from a blend of alcohols with the average carbon number of the ester between 9 and 10 containing between 0.2–0.25% nitrogen by weight provided in the form of N-N Dimethylaminoalkyl-methacrylate.

Lubricating oil compositions useful in the practice of the present invention contain Polymer (i), (ii), (iii), or a mixture thereof, in an amount of from about 0.10 to about 2 wt. %, based on polymer weight; more preferably from about 0.2 to about 1 wt. %, most preferably from about 0.3 to about 0.8 wt. %. Alternatively in discussing the multifunctional components; specifically Polymers (ii) and (iii); said components are present providing nitrogen content to the the lubricating oil composition from about 0.0001 to about 0.02 wt. %, preferably from about 0.0002 to about 0.01 wt. %, most preferably from about 0.0003 to about 0.008 wt. % of nitrogen. Polymers (i), (ii) (iii) and mixtures thereof, need not comprise the sole VM and/or LOFI in the lubricating oil composition, and other VM, such as non-functionalized olefin copolymer VM and, for example, alkylfumarate/vinyl acetate copolymer LOFIs may be used in combination therewith. For example, a heavy duty diesel engine of the present invention may be lubricated with a lubricating oil composition wherein the high molecular weight polymer is a mixture comprising from about 10 to about 90 wt. % of a hydrogenated styrene-isoprene block copolymer, and from about 10 to about 90 wt. % non-functionalized OCP.

Metal-containing or ash-forming detergents function as both detergents to reduce or remove deposits and as acid neutralizers or rust inhibitors, thereby reducing wear and corrosion and extending engine life. Detergents generally comprise a polar head with a long hydrophobic tail. The polar head comprises a metal salt of an acidic organic compound. The salts may contain a substantially stoichiometric amount of the metal in which case they are usually described as normal or neutral salts, and would typically have a total base number or TBN (as can be measured by ASTM D2896) of from 0 to 80. A large amount of a metal base may be incorporated by reacting excess metal compound (e.g., an oxide or hydroxide) with an acidic gas (e.g., carbon dioxide). The resulting overbased detergent comprises neutralized detergent as the outer layer of a metal base (e.g. carbonate) micelle. Such overbased detergents may have a TBN of 150 or greater, and typically will have a TBN of from 250 to 450 or more.

Detergents that may be used include oil-soluble neutral and overbased sulfonates, phenates, sulfurized phenates, thiophosphonates, salicylates, and naphthenates and other oil-soluble carboxylates of a metal, particularly the alkali or alkaline earth metals, e.g., barium, sodium, potassium, lithium, calcium, and magnesium. The most commonly used metals are calcium and magnesium, which may both be present in detergents used in a lubricant, and mixtures of calcium and/or magnesium with sodium. Particularly convenient metal detergents are neutral and overbased calcium sulfonates having TBN of from 20 to 450, neutral and overbased calcium phenates and sulfurized phenates having TBN of from 50 to 450 and neutral and overbased magnesium or calcium salicylates having a TBN of from 20 to 450. Combinations of detergents, whether overbased or neutral or both, may be used. In one preferred lubricating oil composition.

Sulfonates may be prepared from sulfonic acids which are typically obtained by the sulfonation of alkyl substituted aromatic hydrocarbons such as those obtained from the fractionation of petroleum or by the alkylation of aromatic hydrocarbons. Examples included those obtained by alkylating benzene, toluene, xylene, naphthalene, diphenyl or their halogen derivatives such as chlorobenzene, chlorotoluene and chloronaphthalene. The alkylation may be carried out in the presence of a catalyst with alkylating agents having from about 3 to more than 70 carbon atoms. The alkaryl sulfonates usually contain from about 9 to about 80 or more carbon atoms, preferably from about 16 to about 60 carbon atoms per alkyl substituted aromatic moiety.

The oil soluble sulfonates or alkaryl sulfonic acids may be neutralized with oxides, hydroxides, alkoxides, carbonates, carboxylate, sulfides, hydrosulfides, nitrates, borates and ethers of the metal. The amount of metal compound is chosen having regard to the desired TBN of the final product but typically ranges from about 100 to 220 wt. % (preferably at least 125 wt. %) of that stoichiometrically required.

Metal salts of phenols and sulfurized phenols are prepared by reaction with an appropriate metal compound such as an oxide or hydroxide and neutral or overbased products may be obtained by methods well known in the art. Sulfurized phenols may be prepared by reacting a phenol with sulfur or a sulfur containing compound such as hydrogen sulfide, sulfur monohalide or sulfur dihalide, to form products which are generally mixtures of compounds in which 2 or more phenols are bridged by sulfur containing bridges.

Carboxylate detergents, e.g., salicylates, can be prepared by reacting an aromatic carboxylic acid with an appropriate metal compound such as an oxide or hydroxide and neutral or overbased products may be obtained by methods well known in the art. The aromatic moiety of the aromatic carboxylic acid can contain heteroatoms, such as nitrogen and oxygen. Preferably, the moiety contains only carbon atoms; more preferably the moiety contains six or more carbon atoms; for example benzene is a preferred moiety. The aromatic carboxylic acid may contain one or more aromatic moieties, such as one or more benzene rings, either fused or connected via alkylene bridges. The carboxylic moiety may be attached directly or indirectly to the aromatic moiety. Preferably the carboxylic acid group is attached directly to a carbon atom on the aromatic moiety, such as a carbon atom on the benzene ring. More preferably, the aromatic moiety also contains a second functional group, such as a hydroxy group or a sulfonate group, which can be attached directly or indirectly to a carbon atom on the aromatic moiety.

Preferred examples of aromatic carboxylic acids are salicylic acids and sulfurized derivatives thereof, such as hydrocarbyl substituted salicylic acid and derivatives thereof. Processes for sulfurizing, for example a hydrocarbyl—substituted salicylic acid, are known to those skilled in the art. Salicylic acids are typically prepared by carboxylation, for example, by the Kolbe—Schmitt process, of phenoxides, and in that case, will generally be obtained, normally in a diluent, in admixture with uncarboxylated phenol.

Preferred substituents in oil—soluble salicylic acids are alkyl substituents. In alkyl—substituted salicylic acids, the alkyl groups advantageously contain 5 to 100, preferably 9 to 30, especially 14 to 20, carbon atoms. Where there is more than one alkyl group, the average number of carbon atoms in all of the alkyl groups is preferably at least 9 to ensure adequate oil solubility.

Detergents generally useful in the formulation of lubricating oil compositions also include "hybrid" detergents formed with mixed surfactant systems, e.g., phenate/salicylates, sulfonate/phenates, sulfonate/salicylates, sulfonates/phenates/salicylates, as described, for example, in U.S. Pat. Nos. 6,153,565, 6,281,179, 6,429,178 and 6,429,179.

Surprisingly, it has been found that, in the presence of acids generated during the operation of a heavy duty diesel engine provided with an exhaust gas recirculation system in which intake air and/or exhaust gas recirculation streams are cooled to below the dew point for at least 10% of the time said engine is in operation, certain detergents have a significant effect on the rate at which kinematic viscosity rises due to the presence of soot in the lubricating oil. Specifically, it has been found that kinematic viscosity increases due to soot in lubricating oil compositions in heavy duty diesel engine provided with an exhaust gas recirculation system in which intake air and/or exhaust gas recirculation streams are cooled to below the dew point for at least 10% of the time said engine is in operation can be effectively controlled by selecting a detergent system in which from about 50% to 100% of the one or more detergents are phenate and/or salicylate neutral or overbased detergents. Phenate neutral and overbased detergents are preferred. Preferably, lubricating oil compositions useful in the present invention will contain no more than about 30 wt. %, preferably no more than about 20 wt. %, more preferably no more than 5 wt. % sulfonate detergent, based on the total weight of detergent.

It is not unusual to add a detergent or other additive, to a lubricating oil, or additive concentrate, in a diluent, such that only a portion of the added weight represents an active ingredient (A.I.). For example, detergent may be added together with an equal weight of diluent in which case the "additive" is 50% A.I. detergent. As used herein, the term weight percent (wt. %), when applied to a detergent or other additive refers to the weight of active ingredient. Detergents conventionally comprise from about 0.5 to about 5 wt. %, preferably from about 0.8 to about 3.8 wt. %, most preferably from about 1.2 to about 3 wt. % of a lubricating oil composition formulated for use in a heavy duty diesel engine.

Dispersants maintain in suspension materials resulting from oxidation during use that are insoluble in oil, thus preventing sludge flocculation and precipitation, or deposition on metal parts. Dispersants useful in the context of the present invention include the range of nitrogen-containing, ashless (metal-free) dispersants known to be effective to reduce formation of deposits upon use in gasoline and diesel engines, when added to lubricating oils. The ashless, dispersants of the present invention comprise an oil soluble polymeric long chain backbone having functional groups capable of associating with particles to be dispersed. Typically, such dispersants have amine, amine-alcohol or amide polar moieties attached to the polymer backbone, often via a bridging group. The ashless dispersant may be, for example, selected from oil soluble salts, esters, amino-esters, amides, imides and oxazolines of long chain hydrocarbon-substituted mono- and polycarboxylic acids or anhydrides thereof; thiocarboxylate derivatives of long chain hydrocarbons; long chain aliphatic hydrocarbons having polyamine moieties attached directly thereto; and Mannich condensation products formed by condensing a long chain substituted phenol with formaldehyde and polyalkylene polyamine.

Generally, each mono- or dicarboxylic acid-producing moiety will react with a nucleophilic group (amine or amide) and the number of functional groups in the polyalkenyl-substituted carboxylic acylating agent will determine the number of nucleophilic groups in the finished dispersant.

The polyalkenyl moiety of the dispersant of the present invention has a number average molecular weight of from about at least about 1800, preferably between 1800 and 3000, such as between 2000 and 2800, more preferably from about 2100 to 2500, and most preferably from about 2200 to about 2400. The molecular weight of a dispersant is generally expressed in terms of the molecular weight of the polyalkenyl moiety as the precise molecular weight range of the dispersant depends on numerous parameters including the type of polymer used to derive the dispersant, the number of functional groups, and the type of nucleophilic group employed.

The polyalkenyl moiety from which dispersants of the present invention may be derived has a narrow molecular weight distribution (MWD), also referred to as polydispersity, as determined by the ratio of weight average molecular weight ($M_w$) to number average molecular weight ($M_n$). Specifically, polymers from which the dispersants of the present invention are derived have a $M_w/M_n$ of from about 1.5 to about 2.0, preferably from about 1.5 to about 1.9, most preferably from about 1.6 to about 1.8.

Suitable hydrocarbons or polymers employed in the formation of the dispersants of the present invention include homopolymers, interpolymers or lower molecular weight hydrocarbons. One family of such polymers comprise polymers of ethylene and/or at least one $C_3$ to $C_{28}$ alpha-olefin having the formula $H_2C=CHR^1$ wherein $R^1$ is straight or branched chain alkyl radical comprising 1 to 26 carbon atoms and wherein the polymer contains carbon-to-carbon unsaturation, preferably a high degree of terminal ethenylidene unsaturation. Preferably, such polymers comprise interpolymers of ethylene and at least one alpha-olefin of the above formula, wherein $R^1$ is alkyl of from 1 to 18 carbon atoms, and more preferably is alkyl of from 1 to 8 carbon atoms, and more preferably still of from 1 to 2 carbon atoms. Therefore, useful alpha-olefin monomers and comonomers include, for example, propylene, butene-1, hexene-1, octene-1,4-methylpentene-1, decene-1, dodecene-1, tridecene-1, tetradecene-1, pentadecene-1, hexadecene-1, heptadecene-1, octadecene-1, nonadecene-1, and mixtures thereof (e.g., mixtures of propylene and butene-1, and the like). Exemplary of such polymers are propylene homopolymers, butene-1 homopolymers, ethylene-propylene copolymers, ethylene-butene-1 copolymers, propylene-butene copolymers and the like, wherein the polymer contains at least some terminal and/or internal unsaturation. Preferred polymers are unsaturated copolymers of ethylene and propylene and ethylene and butene-1. The interpolymers of this invention may contain a minor amount, e.g. 0.5 to 5 mole % of a $C_4$ to $C_{18}$ non-conjugated diolefin comonomer. However, it is preferred that the polymers of this invention comprise only alpha-olefin homopolymers, interpolymers of alpha-olefin comonomers and interpolymers of ethylene and alpha-olefin comonomers. The molar ethylene content of the polymers employed in this invention is preferably in the range of 0 to 80%, and more preferably 0 to 60%. When propylene and/or butene-1 are employed as comonomer(s) with ethylene, the ethylene content of such copolymers is most preferably between 15 and 50%, although higher or lower ethylene contents may be present.

These polymers may be prepared by polymerizing alpha-olefin monomer, or mixtures of alpha-olefin monomers, or mixtures comprising ethylene and at least one $C_3$ to $C_{28}$ alpha-olefin monomer, in the presence of a catalyst system comprising at least one metallocene (e.g., a cyclopentadienyl-transition metal compound) and an alumoxane compound. Using this process, a polymer in which 95% or more of the polymer chains possess terminal ethenylidene-type unsaturation can be provided. The percentage of polymer chains exhibiting terminal ethenylidene unsaturation may be determined by FTIR spectroscopic analysis, titration, or $C^{13}$ NMR. Interpolymers of this latter type may be characterized by the formula POLY-C($R^1$)=$CH_2$ wherein $R^1$ is $C_1$ to $C_{26}$ alkyl, preferably $C_1$ to $C_{18}$ alkyl, more preferably $C_1$ to $C_8$ alkyl, and most preferably $C_1$ to $C_2$ alkyl, (e.g., methyl or ethyl) and wherein POLY represents the polymer chain. The chain length of the $R^1$ alkyl group will vary depending on the comonomer(s) selected for use in the polymerization. A minor amount of the polymer chains can contain terminal ethenyl, i.e., vinyl, unsaturation, i.e. POLY-CH=$CH_2$, and a portion of the polymers can contain internal monounsaturation, e.g. POLY-CH=CH($R^1$), wherein $R^1$ is as defined above. These terminally unsaturated interpolymers may be prepared by known metallocene chemistry and may also be prepared as described in U.S. Pat. Nos. 5,498,809; 5,663,130; 5,705,577; 5,814,715; 6,022,929 and 6,030,930.

Another useful class of polymers is polymers prepared by cationic polymerization of isobutene, styrene, and the like. Common polymers from this class include polyisobutenes obtained by polymerization of a $C_4$ refinery stream having a butene content of about 35 to about 75% by wt., and an isobutene content of about 30 to about 60% by wt., in the presence of a Lewis acid catalyst, such as aluminum trichloride or boron trifluoride. A preferred source of monomer for making poly-n-butenes is petroleum feedstreams such as Raffinate II. These feedstocks are disclosed in the art such as in U.S. Pat. No. 4,952,739. Polyisobutylene is a most preferred backbone of the present invention because it is readily available by cationic polymerization from butene streams (e.g., using $AlCl_3$ or $BF_3$ catalysts). Such polyisobutylenes generally contain residual unsaturation in amounts of about one ethylenic double bond per polymer chain, positioned along the chain. A preferred embodiment utilizes polyisobutylene prepared from a pure isobutylene stream or a Raffinate I stream to prepare reactive isobutylene polymers with terminal vinylidene olefins. Preferably, these polymers, referred to as highly reactive polyisobutylene (HR-PIB), have a terminal vinylidene content of at least 65%, e.g., 70%, more preferably at least 80%, most preferably, at least 85%. The preparation of such polymers is described, for example, in U.S. Pat. No. 4,152,499. HR-PIB is known and HR-PIB is commercially available under the tradenames Glissopa™ (from BASF) and Ultravis™ (from BP-Amoco).

Polyisobutylene polymers that may be employed are generally based on a hydrocarbon chain of from about 1800 to 3000. Methods for making polyisobutylene are known. Polyisobutylene can be functionalized by halogenation (e.g. chlorination), the thermal "ene" reaction, or by free radical grafting using a catalyst (e.g. peroxide), as described below.

The hydrocarbon or polymer backbone can be functionalized, e.g., with carboxylic acid producing moieties (preferably acid or anhydride moieties) selectively at sites of carbon-to-carbon unsaturation on the polymer or hydrocarbon chains, or randomly along chains using any of the three processes mentioned above or combinations thereof, in any sequence.

Processes for reacting polymeric hydrocarbons with unsaturated carboxylic acids, anhydrides or esters and the preparation of derivatives from such compounds are disclosed in U.S. Pat. Nos. 3,087,936; 3,172,892; 3,215,707; 3,231,587; 3,272,746; 3,275,554; 3,381,022; 3,442,808; 3,565,804; 3,912,764; 4,110,349; 4,234,435; 5,777,025; 5,891,953; as well as EP 0 382 450 B1; CA-1,335,895 and GB-A-1,440,219. The polymer or hydrocarbon may be functionalized, for example, with carboxylic acid producing moieties (preferably acid or anhydride) by reacting the polymer or hydrocarbon under conditions that result in the addition of functional moieties or agents, i.e., acid, anhydride, ester moieties, etc., onto the polymer or hydrocarbon chains primarily at sites of carbon-to-carbon unsaturation (also referred to as ethylenic or olefinic unsaturation) using the halogen assisted functionalization (e.g. chlorination) process or the thermal "ene" reaction.

Selective functionalization can be accomplished by halogenating, e.g., chlorinating or brominating the unsaturated α-olefin polymer to about 1 to 8 wt. %, preferably 3 to 7 wt. % chlorine, or bromine, based on the weight of polymer or hydrocarbon, by passing the chlorine or bromine through the polymer at a temperature of 60 to 250° C., preferably 110 to 160° C., e.g., 120 to 140° C., for about 0.5 to 10, preferably 1 to 7 hours. The halogenated polymer or hydrocarbon (hereinafter backbone) is then reacted with sufficient monounsaturated reactant capable of adding the required number of functional moieties to the backbone, e.g., monounsaturated carboxylic reactant, at 100 to 250° C., usually about 180° C. to 235° C., for about 0.5 to 10, e.g., 3 to 8 hours, such that the product obtained will contain the desired number of moles of the monounsaturated carboxylic reactant per mole of the halogenated backbones. Alternatively, the backbone and the monounsaturated carboxylic reactant are mixed and heated while adding chlorine to the hot material.

While chlorination normally helps increase the reactivity of starting olefin polymers with monounsaturated functionalizing reactant, it is not necessary with some of the polymers or hydrocarbons contemplated for use in the present invention, particularly those preferred polymers or hydrocarbons which possess a high terminal bond content and reactivity. Preferably, therefore, the backbone and the monounsaturated functionality reactant, e.g., carboxylic reactant, are contacted at elevated temperature to cause an initial thermal "ene" reaction to take place. Ene reactions are known.

The hydrocarbon or polymer backbone can be functionalized by random attachment of functional moieties along the polymer chains by a variety of methods. For example, the polymer, in solution or in solid form, may be grafted with the monounsaturated carboxylic reactant, as described above, in the presence of a free-radical initiator. When performed in solution, the grafting takes place at an elevated temperature in the range of about 100 to 260° C., preferably 120 to 240° C. Preferably, free-radical initiated grafting would be accomplished in a mineral lubricating oil solution containing, e.g., 1 to 50 wt. %, preferably 5 to 30 wt. % polymer based on the initial total oil solution.

The free-radical initiators that may be used are peroxides, hydroperoxides, and azo compounds, preferably those that have a boiling point greater than about 100° C. and decompose thermally within the grafting temperature range to provide free-radicals. Representative of these free-radical initiators are azobutyronitrile, 2,5-dimethylhex-3-ene-2,5-bis-tertiary-butyl peroxide and dicumene peroxide. The initiator, when used, typically is used in an amount of between 0.005% and 1% by weight based on the weight of the reaction mixture solution. Typically, the aforesaid monounsaturated carboxylic reactant material and free-radical initiator are used in a weight ratio range of from about 1.0:1 to 30:1, preferably 3:1 to 6:1. The grafting is preferably carried out in an inert atmosphere, such as under nitrogen blanketing. The resulting grafted polymer is characterized by having carboxylic acid (or ester or anhydride) moieties randomly attached along the polymer chains: it being understood, of course, that some of the polymer chains remain ungrafted. The free radical grafting described above can be used for the other polymers and hydrocarbons of the present invention.

The preferred monounsaturated reactants that are used to functionalize the backbone comprise mono- and dicarboxylic acid material, i.e., acid, anhydride, or acid ester material, including (i) monounsaturated $C_4$ to $C_{10}$ dicarboxylic acid wherein (a) the carboxyl groups are vicinyl, (i.e., located on adjacent carbon atoms) and (b) at least one, preferably both, of said adjacent carbon atoms are part of said mono unsaturation; (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated with the carboxy group, i.e., of the structure —C=C—CO—; and (iv) derivatives of (iii) such as $C_1$ to $C_5$ alcohol derived mono- or diesters of (iii). Mixtures of monounsaturated carboxylic materials (i)–(iv) also may be used. Upon reaction with the backbone, the monounsaturation of the monounsaturated carboxylic reactant becomes saturated. Thus, for example, maleic anhydride becomes backbone-substituted succinic anhydride, and acrylic acid becomes backbone-substituted propionic acid. Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, and methyl fumarate.

To provide the required functionality, the monounsaturated carboxylic reactant, preferably maleic anhydride, typically will be used in an amount ranging from about equimolar amount to about 100 wt. % excess, preferably 5 to 50 wt. % excess, based on the moles of polymer or hydrocarbon. Unreacted excess monounsaturated carboxylic reactant can be removed from the final dispersant product by, for example, stripping, usually under vacuum, if required.

The functionalized oil-soluble polymeric hydrocarbon backbone is then derivatized with a nitrogen-containing nucleophilic reactant, such as an amine, amino-alcohol, amide, or mixture thereof, to form a corresponding derivative. Amine compounds are preferred. Useful amine compounds for derivatizing functionalized polymers comprise at least one amine and can comprise one or more additional amine or other reactive or polar groups. These amines may be hydrocarbyl amines or may be predominantly hydrocarbyl amines in which the hydrocarbyl group includes other groups, e.g., hydroxy groups, alkoxy groups, amide groups, nitrites, imidazoline groups, and the like. Particularly useful amine compounds include mono- and polyamines, e.g., polyalkene and polyoxyalkylene polyamines of about 2 to 60, such as 2 to 40 (e.g., 3 to 20) total carbon atoms having about 1 to 12, such as 3 to 12, preferably 3 to 9, most preferably form about 6 to about 7 nitrogen atoms per molecule. Mixtures of amine compounds may advantageously be used, such as those prepared by reaction of alkylene dihalide with ammonia. Preferred amines are aliphatic saturated amines, including, for example, 1,2-diaminoethane; 1,3-diaminopropane; 1,4-diaminobutane; 1,6-diaminohexane; polyethylene amines such as diethylene triamine; triethylene tetramine; tetraethylene pentamine; and polypropyleneamines such as 1,2-propylene diamine; and di-(1,2-propylene)triamine. Such polyamine mixtures, known as PAM, are commercially available. Particularly preferred polyamine mixtures are mixtures derived by distilling the light ends from PAM products. The resulting mixtures, known as "heavy" PAM, or HPAM, are also commercially available. The properties and attributes of both PAM and/or HPAM are described, for example, in U.S. Pat. Nos. 4,938,881; 4,927,551; 5,230,714; 5,241,003; 5,565,128; 5,756,431; 5,792,730; and 5,854,186.

Other useful amine compounds include: alicyclic diamines such as 1,4-di(aminomethyl) cyclohexane and heterocyclic nitrogen compounds such as imidazolines. Another useful class of amines is the polyamido and related amido-amines as disclosed in U.S. Pat. Nos. 4,857,217; 4,956,107; 4,963,275; and 5,229,022. Also usable is tris(hydroxymethyl)amino methane (TAM) as described in U.S. Pat. Nos. 4,102,798; 4,113,639; 4,116,876; and UK 989,409. Dendrimers, star-like amines, and comb-structured amines may also be used. Similarly, one may use condensed amines, as described in U.S. Pat. No. 5,053,152. The functionalized polymer is reacted with the amine compound using conventional techniques as described, for example, in U.S. Pat. Nos. 4,234,435 and 5,229,022, as well as in EP-A-208,560.

A preferred dispersant composition is one comprising at least one polyalkenyl succinimide, which is the reaction product of a polyalkenyl substituted succinic anhydride (e.g., PIBSA) and a polyamine (PAM) that has a coupling ratio of from about 0.65 to about 1.25, preferably from about 0.8 to about 1.1, most preferably from about 0.9 to about 1. In the context of this disclosure, "coupling ratio" may be defined as a ratio of the number of succinyl groups in the PIBSA to the number of primary amine groups in the polyamine reactant.

Another class of high molecular weight ashless dispersants comprises Mannich base condensation products. Generally, these products are prepared by condensing about one mole of a long chain alkyl-substituted mono- or polyhydroxy benzene with about 1 to 2.5 moles of carbonyl compound(s) (e.g., formaldehyde and paraformaldehyde) and about 0.5 to 2 moles of polyalkylene polyamine, as disclosed, for example, in U.S. Pat. No. 3,442,808. Such Mannich base condensation products may include a polymer product of a metallocene catalyzed polymerization as a substituent on the benzene group, or may be reacted with a compound containing such a polymer substituted on a succinic anhydride in a manner similar to that described in U.S. Pat. No. 3,442,808. Examples of functionalized and/or derivatized olefin polymers synthesized using metallocene catalyst systems are described in the publications identified supra.

The dispersant(s) of the present invention are preferably non-polymeric (e.g., are mono- or bis-succinimides).

Preferred dispersants include those in which greater than about 50 wt. % of the nitrogen is non-basic. The normally basic nitrogen of nitrogen-containing dispersants can be rendered non-basic by reacting the nitrogen-containing dispersant with a so-called "capping agent". Conventionally, nitrogen-containing dispesants have been capped to reduce the adverse effect such dispersants have on the nitrile seals used in engines. Numerous capping agents and methods are known. The reaction of a nitrogen-containing dispersant and tautomeric acetoacetate (e.g., ethyl acetoacetate (EAA)) is described, for example, in U.S. Pat. Nos. 4,839,071; 4,839,072 and 4,579,675. The reaction of a nitrogen-containing dispersant and formalin and/or formic acid is described, for example, in U.S. Pat. No. 3,185,704. Capping of nitrogen-containing dispersants with epoxides is described, for example, in U.S. Pat. Nos. 3,267,704; 3,373,021 and 3,373,111. The reaction product of a nitrogen-containing dispersant and other known capping agents are described in U.S. Pat. Nos. 3,366,569 (acrylonitrile); 4,636,322 and 4,663,064 (glycolic acid); 4,612,132; 5,334,321; 5,356,552; 5,716,912; 5,849,676; 5,861,363 carbonates, e.g., ethylene carbonate) 4,686,054 (maleic anhydride or succinic anhydride); 3,254,025; 3,087,963 (boron). The foregoing list is not exhaustive and other methods of capping nitrogen-containing dispersants are known to those skilled in the art.

For the purpose of reducing rate at which the kinematic viscosity of lubricating oil increases in the presence of soot and acids generated upon use of heavy duty diesel engines provided with EGR systems that operate in a condensing mode, nitrogen-containing dispersants in which greater than about 50 wt. % of the nitrogen is rendered non-basic by reaction with formalin, formic acid, epoxides and tautomeric acetoacetate (e.g., ethyl acetoacetate), are preferred.

Additional additives may be incorporated into the compositions of the invention to enable particular performance requirements to be met. Examples of additives which may be included in the lubricating oil compositions of the present invention are metal rust inhibitors, viscosity index improvers (other than polymer i, iii and/or iii), corrosion inhibitors, oxidation inhibitors, friction modifiers, anti-foaming agents, anti-wear agents and pour point depressants (other than polymer iii). Some are discussed in further detail below.

Dihydrocarbyl dithiophosphate metal salts are frequently used as antiwear and antioxidant agents. The metal may be an alkali or alkaline earth metal, or aluminum, lead, tin, molybdenum, manganese, nickel or copper. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dihydrocarbyl dithiophosphoric acid (DDPA), usually by reaction of one or more alcohol or a phenol with $P_2S_5$ and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used but the oxides, hydroxides and carbonates are most generally employed. Commercial additives frequently contain an excess of zinc due to the use of an excess of the basic zinc compound in the neutralization reaction.

The preferred zinc dihydrocarbyl dithiophosphates are oil soluble salts of dihydrocarbyl dithiophosphoric acids and may be represented by the following formula:

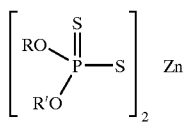

wherein R and R' may be the same or different hydrocarbyl radicals containing from 1 to 18, preferably 2 to 12, carbon atoms and including radicals such as alkyl, alkenyl, aryl, arylalkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. In order to obtain oil solubility, the total number of carbon atoms (i.e. R and R') in the dithiophosphoric acid will generally be about 5 or greater. The zinc dihydrocarbyl dithiophosphate can therefore comprise zinc dialkyl dithiophosphates. The present invention may be particularly useful when used with lubricant compositions containing phosphorus levels of from about 0.02 to about 0.12 wt. %, preferably from about 0.03 to about 0.10 wt. %. More preferably, the phosphorous level of the lubricating oil composition will be less than about 0.08 wt. %, such as from about 0.05 to about 0.08 wt. %.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, oil soluble phenates and sulfurized phenates, phosphosulfurized or sulfurized hydrocarbons or esters, phosphorous esters, metal thiocarbamates, oil soluble copper compounds as described in U.S. Pat. No. 4,867,890, and molybdenum-containing compounds.

Aromatic amines having at least two aromatic groups attached directly to the nitrogen constitute another class of compounds that is frequently used for antioxidancy. While these materials may be used in small amounts, preferred embodiments of the present invention are free of these compounds. They are preferably used in only small amounts, i.e., up to 0.4 wt. %, or more preferably avoided altogether other than such amount as may result as an impurity from another component of the composition.

Typical oil soluble aromatic amines having at least two aromatic groups attached directly to one amine nitrogen contain from 6 to 16 carbon atoms. The amines may contain more than two aromatic groups. Compounds having a total of at least three aromatic groups in which two aromatic groups are linked by a covalent bond or by an atom or group (e.g., an oxygen or sulfur atom, or a —CO—, —$SO_2$— or alkylene group) and two are directly attached to one amine nitrogen also considered aromatic amines having at least two aromatic groups attached directly to the nitrogen. The aromatic rings are typically substituted by one or more substituents selected from alkyl, cycloalkyl, alkoxy, aryloxy, acyl, acylamino, hydroxy, and nitro groups. The amount of any such oil soluble aromatic amines having at least two aromatic groups attached directly to one amine nitrogen should preferably not exceed 0.4 wt. % active ingredient.

Representative examples of suitable viscosity modifiers are polyisobutylene, copolymers of ethylene and propylene, polymethacrylates, methacrylate copolymers, copolymers of an unsaturated dicarboxylic acid and a vinyl compound, interpolymers of styrene and acrylic esters, and partially hydrogenated copolymers of styrene/isoprene, styrene/butadiene, and isoprene/butadiene, as well as the partially hydrogenated homopolymers of butadiene and isoprene.

Friction modifiers and fuel economy agents that are compatible with the other ingredients of the final oil may also be included. Examples of such materials include glyceryl monoesters of higher fatty acids, for example, glyceryl mono-oleate; esters of long chain polycarboxylic acids with diols, for example, the butane diol ester of a dimerized unsaturated fatty acid; oxazoline compounds; and alkoxylated alkyl-substituted mono-amines, diamines and alkyl ether amines, for example, ethoxylated tallow amine and ethoxylated tallow ether amine. A preferred lubricating oil composition contains a dispersant composition of the present invention, base oil, and a nitrogen-containing friction modifier.

Other known friction modifiers comprise oil-soluble organo-molybdenum compounds. Such organo-molybdenum friction modifiers also provide antioxidant and antiwear credits to a lubricating oil composition. As an example of such oil soluble organo-molybdenum compounds, there may be mentioned the dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates and alkylthioxanthates.

Additionally, the molybdenum compound may be an acidic molybdenum compound. These compounds will react with a basic nitrogen compound as measured by ASTM test D-664 or D-2896 titration procedure and are typically hexavalent. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds.

Among the molybdenum compounds useful in the compositions of this invention are organo-molybdenum compounds of the formula

 and

wherein R is an organo group selected from the group consisting of alkyl, aryl, aralkyl and alkoxyalkyl, generally of from 1 to 30 carbon atoms, and preferably 2 to 12 carbon atoms and most preferably alkyl of 2 to 12 carbon atoms. Especially preferred are the dialkyldithiocarbamates of molybdenum.

Another group of organo-molybdenum compounds useful in the lubricating compositions of this invention are tri-nuclear molybdenum compounds, especially those of the formula $Mo_3S_kL_nQ_z$ and mixtures thereof wherein the L are independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms should be present among all the ligands' organo groups, such as at least 25, at least 30, or at least 35 carbon atoms.

The ligands are independently selected from the group of

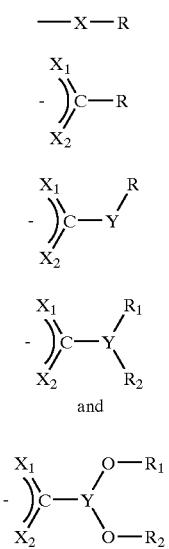

and mixtures thereof, wherein X, $X_1$, $X_2$, and Y are independently selected from the group of oxygen and sulfur, and wherein $R_1$, $R_2$, and R are independently selected from hydrogen and organo groups that may be the same or different. Preferably, the organo groups are hydrocarbyl groups such as alkyl (e.g., in which the carbon atom attached to the remainder of the ligand is primary or secondary), aryl, substituted aryl and ether groups. More preferably, each ligand has the same hydrocarbyl group.

The term "hydrocarbyl" denotes a substituent having carbon atoms directly attached to the remainder of the ligand and is predominantly hydrocarbyl in character within the context of this invention. Such substituents include the following:
1. Hydrocarbon substituents, that is, aliphatic (for example alkyl or alkenyl), alicyclic (for example cycloalkyl or cycloalkenyl) substituents, aromatic-, aliphatic- and alicyclic-substituted aromatic nuclei and the like, as well as cyclic substituents wherein the ring is completed through another portion of the ligand (that is, any two indicated substituents may together form an alicyclic group).
2. Substituted hydrocarbon substituents, that is, those containing non-hydrocarbon groups which, in the context of this invention, do not alter the predominantly hydrocarbyl character of the substituent. Those skilled in the art will be aware of suitable groups (e.g., halo, especially chloro and fluoro, amino, alkoxyl, mercapto, alkylmercapto, nitro, nitroso, sulfoxy, etc.).
3. Hetero substituents, that is, substituents which, while predominantly hydrocarbon in character within the context of this invention, contain atoms other than carbon present in a chain or ring otherwise composed of carbon atoms.

Importantly, the organo groups of the ligands have a sufficient number of carbon atoms to render the compound soluble or dispersible in the oil. For example, the number of carbon atoms in each group will generally range between about 1 to about 100, preferably from about 1 to about 30, and more preferably between about 4 to about 20. Preferred ligands include dialkyldithiophosphate, alkylxanthate, and dialkyldithiocarbamate, and of these dialkyldithiocarbamate is more preferred. Organic ligands containing two or more of the above functionalities are also capable of serving as ligands and binding to one or more of the cores. Those skilled in the art will realize that formation of the compounds of the present invention requires selection of ligands having the appropriate charge to balance the core's charge.

Compounds having the formula $Mo_3S_kL_nQ_z$ have cationic cores surrounded by anionic ligands and are represented by structures such as

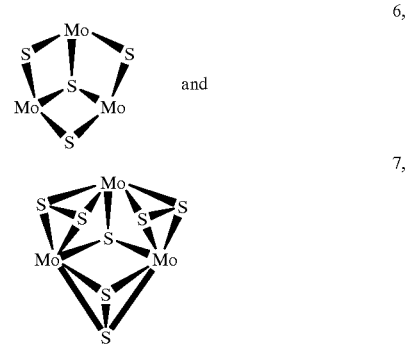

and have net charges of +4. Consequently, in order to solubilize these cores the total charge among all the ligands must be −4. Four monoanionic ligands are preferred. Without wishing to be bound by any theory, it is believed that two or more trinuclear cores may be bound or interconnected by means of one or more ligands and the ligands may be multidentate. Such structures fall within the scope of this invention. This includes the case of a multidentate ligand having multiple connections to a single core. It is believed that oxygen and/or selenium may be substituted for sulfur in the core(s).

Oil-soluble or dispersible trinuclear molybdenum compounds can be prepared by reacting in the appropriate liquid(s)/solvent(s) a molybdenum source such as $(NH_4)_2Mo_3S_{13}.n(H_2O)$, where n varies between 0 and 2 and includes non-stoichiometric values, with a suitable ligand source such as a tetralkylthiuram disulfide. Other oil-soluble or dispersible trinuclear molybdenum compounds can be formed during a reaction in the appropriate solvent(s) of a molybdenum source such as of $(NH_4)_2Mo_3S_{13}.n(H_2O)$, a ligand source such as tetralkylthiuram disulfide, dialkyldithiocarbamate, or dialkyldithiophosphate, and a sulfur abstracting agent such cyanide ions, sulfite ions, or substituted phosphines. Alternatively, a trinuclear molybdenum-sulfur halide salt such as $[M']_2[Mo_3S_7A_6]$, where M' is a counter ion, and A is a halogen such as Cl, Br, or I, may be reacted with a ligand source such as a dialkyldithiocarbamate or dialkyldithiophosphate in the appropriate liquid(s)/solvent(s) to form an oil-soluble or dispersible trinuclear molybdenum compound. The appropriate liquid/ solvent may be, for example, aqueous or organic.

A compound's oil solubility or dispersibility may be influenced by the number of carbon atoms in the ligand's organo groups. In the compounds of the present invention, at least 21 total carbon atoms should be present among all the ligand's organo groups. Preferably, the ligand source chosen has a sufficient number of carbon atoms in its organo groups to render the compound soluble or dispersible in the lubricating composition.

The terms "oil-soluble" or "dispersible" used herein do not necessarily indicate that the compounds or additives are soluble, dissolvable, miscible, or capable of being suspended in the oil in all proportions. These do mean, however, that they are, for instance, soluble or stably dispersible in oil to an extent sufficient to exert their intended effect in the environment in which the oil is employed. Moreover, the additional incorporation of other additives may also permit incorporation of higher levels of a particular additive, if desired.

The molybdenum compound is preferably an organomolybdenum compound. Moreover, the molybdenum compound is preferably selected from the group consisting of a molybdenum dithiocarbamate (MoDTC), molybdenum dithiophosphate, molybdenum dithiophosphinate, molybdenum xanthate, molybdenum thioxanthate, molybdenum sulfide and mixtures thereof. Most preferably, the molybdenum compound is present as molybdenum dithiocarbamate. The molybdenum compound may also be a trinuclear molybdenum compound.

A viscosity index improver dispersant functions both as a viscosity index improver and as a dispersant. Examples of viscosity index improver dispersants include reaction products of amines, for example polyamines, with a hydrocarbyl-substituted mono -or dicarboxylic acid in which the hydrocarbyl substituent comprises a chain of sufficient length to impart viscosity index improving properties to the compounds. In general, the viscosity index improver dispersant may be, for example, a polymer of a $C_4$ to $C_{24}$ unsaturated ester of vinyl alcohol or a $C_3$ to $C_{10}$ unsaturated monocarboxylic acid or a $C_4$ to $C_{10}$ di-carboxylic acid with an unsaturated nitrogen-containing monomer having 4 to 20 carbon atoms; a polymer of a $C_2$ to $C_{20}$ olefin with an unsaturated $C_3$ to $C_{10}$ mono- or di-carboxylic acid neutralised with an amine, hydroxyamine or an alcohol; or a polymer of ethylene with a $C_3$ to $C_{20}$ olefin further reacted either by grafting a $C_4$ to $C_{20}$ unsaturated nitrogen-containing monomer thereon or by grafting an unsaturated acid onto the polymer backbone and then reacting carboxylic acid groups of the grafted acid with an amine, hydroxy amine or alcohol. A preferred lubricating oil composition contains a dispersant composition of the present invention, base oil, and a viscosity index improver dispersant.

Pour point depressants, otherwise known as lube oil flow improvers (LOFI), lower the minimum temperature at which the fluid will flow or can be poured. Such additives are well known. Typical of those additives that improve the low temperature fluidity of the fluid are $C_8$ to $C_{18}$ dialkyl fumarate/vinyl acetate copolymers, and polymethacrylates. Foam control can be provided by an antifoamant of the polysiloxane type, for example, silicone oil or polydimethyl siloxane.

Some of the above-mentioned additives can provide a multiplicity of effects; thus for example, a single additive may act as a dispersant-oxidation inhibitor. This approach is well known and need not be further elaborated herein.

In the present invention it may be necessary to include an additive which maintains the stability of the viscosity of the blend. Thus, although polar group-containing additives achieve a suitably low viscosity in the pre-blending stage it has been observed that some compositions increase in viscosity when stored for prolonged periods. Additives which are effective in controlling this viscosity increase include the long chain hydrocarbons functionalized by reaction with mono- or dicarboxylic acids or anhydrides which are used in the preparation of the ashless dispersants as hereinbefore disclosed.

When lubricating compositions contain one or more of the above-mentioned additives, each additive is typically blended into the base oil in an amount that enables the additive to provide its desired function. Representative effective amounts of such additives, when used in crankcase lubricants, are listed below. All the values listed are stated as mass percent active ingredient.

| ADDITIVE | MASS % (Broad) | MASS % (Preferred) |
|---|---|---|
| Metal Detergents | 0.1–15 | 0.2–9 |
| Corrosion Inhibitor | 0–5 | 0–1.5 |
| Metal Dihydrocarbyl Dithiophosphate | 0.1–6 | 0.1–4 |
| Antioxidant | 0–5 | 0.01–2 |
| Pour Point Depressant | 0.01–5 | 0.01–1.5 |
| Antifoaming Agent | 0–5 | 0.001–0.15 |
| Supplemental Antiwear Agents | 0–1.0 | 0–0.5 |
| Friction Modifier | 0–5 | 0–1.5 |
| Viscosity Modifier | 0.01–10 | 0.25–3 |
| Basestock | Balance | Balance |

Preferably, the Noack volatility of the fully formulated lubricating oil composition (oil of lubricating viscosity plus all additives) will be no greater than 12, such as no greater than 10, preferably no greater than 8.

It may be desirable, although not essential, to prepare one or more additive concentrates comprising additives (concentrates sometimes being referred to as additive packages) whereby several additives can be added simultaneously to the oil to form the lubricating oil composition.

The final composition may employ from 5 to 25 mass %, preferably 5 to 18 mass %, typically 10 to 15 mass % of the concentrate, the remainder being oil of lubricating viscosity.

This invention will be further understood by reference to the following examples, wherein all parts are parts by weight, unless otherwise noted and which include preferred embodiments of the invention.

EXAMPLES

The ability of a composition to control soot-induced viscosity increase, and thus, the ability of a composition to maintain soot in suspension, can be measured using bench tests, such as the test method described herein. Base oil and additive components are blended to provide a formulated oil. Carbon black powder is then added to the formulated oil. The kinematic viscosity at 100° C. of the carbon black dispersion is measured using the test method described in ASTM D445.

To demonstrate the advantages of the present invention, a comparison was made between the kinematic viscosity increase of carbon back treated lubricating oil in the presence, and in the absence, of 96% sulfuric acid. The addition of the acid (1 wt. % of 96% sulfuric acid) simulates conditions in a heavy duty diesel engine provided with an EGR system operated in a condensing mode. In the testing described below, 3 wt. % of carbon black was added to lubricating oil compositions formulated with commercial detergent inhibitor (DI) package containing dispersant, detergent (calcium phenate and calcium sulfonate), antioxidant, anti-wear agent (ZDDP) and antifoamant and a commercial polymeric viscosity modifier, as shown below.

SV151 is a styrene/diene copolymer available from Infineum USA L.P. ACRYLOID 954 is a multifunctional polymethacrylate viscosity modifier available from Rohmax USA Inc. HITEC 5777 and PA 1160 are multifunctional OCP viscosity modifiers available commercially from Ethyl Corporation and Dutch Staaten Minen, respectively. The performance of formulated oils containing these viscosity modifiers, which are each within the scope of the present invention, was compared to that of a formulation containing a conventional, non-functionalized OCP copolymer (PTN 8011, available from ORONITE, a division of Chevron Texaco). In each of the formulations, the amount of viscosity modifier was adjusted such that the lubricating oil compositions all qualified as a 15W40 grade oil (initial kv of 12.5 to 16.5 cst), as specified in ASTM D445 test method. The results of the comparison are shown below, in Table 1.

induced kinematic viscosity properties in the absence of the acid, the presence of acid resulted in an increase in kinematic viscosity of from 1365% to 1644%. In contrast, the kinematic viscosity of the lubricant containing the phenate detergent increased only 275% to a still acceptable 166.4 cst.

The response of a lubricating oil compositions formulated with commercial detergent inhibitor (DI) package containing dispersant, detergent (calcium phenate and calcium sulfonate), anti-oxidant, antiwear agent (ZDDP) and anti-

TABLE 1

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| DI Package (mass %) | 19.6 | 19.6 | 16.25 | 16.25 | 16.25 | 16.25 | 16.25 | 16.25 | 16.25 | 16.25 | 16.25 |
| SV151 (mass %) | 14.0 | | 14.0 | | | | | | | | |
| PTN8011 (mass %) | | 5.6 | | 5.6 | 5.6 | | | | | | |
| ACRYLOID 954 (mass %) | | | | | | 6.0 | 6.0 | | | | |
| HITEC5777 (mass %) | | | | | | | | 6.0 | 6.0 | | |
| PA1160 (mass %) | | | | | | | | | | 6.0 | 6.0 |
| Base Oil 1* (mass %) | | 74.6 | | 78.15 | | 77.75 | | 77.75 | | 77.75 | |
| Base Oil 2** (mass %) | 66.4 | | 69.75 | | 78.15 | | 77.75 | | 77.75 | | 77.75 |
| CB Kv @ 100° C. (cst) | 25.79 | 37.00 | 24.46 | 19.20 | 19.82 | 34.67 | 37.96 | 17.91 | 20.59 | 18.55 | 21.28 |
| CB/Acid Kv @ 100° C. (cst) | 28.14 | 324.00 | 46.12 | 293.3 | 211.1 | 42.25 | 43.92 | 61.84 | 23.92 | 71.89 | 46.29 |
| CB Kv-CB/Acid Kv @ 100° C. (cst) | 2.35 | 287.00 | 21.66 | 274.10 | 191.28 | 7.58 | 5.96 | 43.93 | 3.33 | 53.34 | 25.01 |

*blend of Group I and Group II Base Oil(s) 84–85% saturates
**Group II Base Oil(s) 92% saturates As shown by the data of Table 1, the presence of acids increases the soot-induced kinematic viscosity of the lubricating oil compositions containing the conventional OCP viscosity modifier by 875% (Example 2), to 1528% (Example 4), and resulted in extremely high absolute kinematic viscosities (211.1 cst to 324.0 cst). In contrast, lubricating oil compositions containing Polymers (i), (ii) and (iii) showed an increase in kinematic viscosity of only 9% (Example 1) to 288% (Example 11), and acceptable absolute kinematic viscosity values of from 28.14 cst to 71.89 cst.

To demonstrate the response of detergents in the heavy duty diesel engines of the present invention, a comparison was made between kinematic viscosity increase of lubricating oil compositions in the presence and absence of 1 wt. % pure sulfuric acid, using the carbon black test procedure (3 wt. % carbon black), as described supra. Detergents were blended with base oil containing dispersant, antioxidant and antiwear agent (ZDDP). The results of the comparison are set forth in Table 2.

TABLE 2

| Example No. | 12 | 13 | 14 |
|---|---|---|---|
| Detergent Type | Ca Phenate | Ca Sulfonate | Mg Sulfonate |
| TBN | 250 | 295 | 400 |
| Detergent Amount (wt. %) | 3.0 | 2.0 | 2.0 |
| CB Kv@ 100° C. (cst) | 44.4 | 18.1 | 20.3 |
| CB/Acid Kv@ 100° C. (cst) | 166.4 | 315.7 | 297.4 |
| CB Kv -CB/Acid Kv @ 100° C. (cst) | 122.0 | 297.6 | 277.1 |

As shown in Table 2, the response of the detergents to the presence of the acid were dramatically different. Although the use of the sulfonate detergents provided superior soot-foamant to the presence of 1 wt. % sulfuric acid in a carbon black test (3 wt. % carbon black), as described above, was compared to that of an identical lubricating oil composition, in which greater than 50% of the dispersant nitrogen was rendered non-basic by reaction (capping) with EAA (ethyl acetoacetate). The results are set forth below, in Table 3.

TABLE 3

| Example No. | 15 | 16 |
|---|---|---|
| Dispersant Amount (wt. %) | 9.0 | 9.0 |
| Dispersant Capping Agent | None | EAA |
| CB Kv@ 100° C. (cst) | 23.5 | 18.4 |
| CB/Acid Kv@ 100° C. (cst) | 158.8 | 63.4 |
| CB Kv -CB/Acid Kv @ 100° C. (cst) | 135.3 | 45 |

As shown by the data of Table 3, the presence of the acid caused a kinematic viscosity increase 576% in the lubricating oil composition containing the uncapped dispersant. In contrast, the presence of the acid caused the kinematic viscosity of the lubricating oil composition containing the capped dispersant to increase only 244%.

The disclosures of all patents, articles and other materials described herein are hereby incorporated, in their entirety, into this specification by reference. Compositions described as "comprising" a plurality of defined components are to be construed as including compositions formed by admixing the defined plurality of defined components The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention.

What is claimed is:

1. A heavy duty diesel engine provided with an exhaust gas recirculation system in which intake air and/or exhaust gas recirculation streams are cooled to below the dew point for at least 10% of the time said engine is in operation, said engine being lubricated with a lubricating oil composition comprising a major amount of oil of lubricating viscosity, and a minor amount of one or more high molecular weight polymers comprising (i) copolymers of hydrogenated poly (monovinyl aromatic hydrocarbon) and poly (conjugated diene), wherein the hydrogenated poly(monovinyl aromatic hydrocarbon) segment comprises at least about 20 wt. % of the copolymer; (ii) olefin copolymers containing alkyl or aryl amine, or amide groups, nitrogen-containing heterocyclic groups or ester linkages and/or (iii) acrylate or alkylacrylate copolymer derivatives having dispersing groups.

2. The heavy duty diesel engine of claim 1, wherein said oil of lubricating viscosity has a saturates content of at least 75%, and said one or more high molecular weight polymers comprises a hydrogenated styrene-isoprene block copolymer.

3. The heavy duty diesel engine of claim 1, wherein said one or more high molecular weight polymers comprises a mixture of from about 10 to about 90 wt. % of a hydrogenated styrene-isoprene block copolymer, and from about 10 to about 90 wt. % of an olefin copolymer.

4. The heavy duty diesel engine of claim 1, wherein the lubricating oil composition further comprises a minor amount of one or more neutral and/overbased metal-containing detergents, wherein from about 50% to 100% of the one or more detergents are phenate and/or salicylate detergents.

5. The heavy duty diesel engine of claim 1, wherein from about 50% to 100% of the one or more detergents are phenate detergents.

6. The heavy duty diesel engine of claim 1, wherein the lubricating oil composition further comprises a minor amount of one or more nitrogen-containing dispersants wherein greater than 50 wt. % of the dispersant nitrogen is non-basic.

7. The heavy duty diesel engine of claim 6, wherein said nitrogen-containing dispersant is a reaction product of a polyalkenyl succinimide and a capping agent selected from the group consisting of tautomeric acetoacetate, formalin, formic acid, epoxides, acrylonitrile, glycolic acid, carbonates, e.g., ethylene carbonate) maleic anhydride and succinic anhydride.

8. The heavy duty diesel engine of claim 7, wherein said capping agent is selected from ethyl acetoacetate, ethylene carbonate, formalin, formic acid and epoxide.

9. A heavy duty diesel engine provided with an exhaust gas recirculation system in which intake air and/or exhaust gas recirculation streams are cooled to below the dew point for at least 10% of the time said engine is in operation, said engine being lubricated with a lubricating oil composition comprising a major amount of oil of lubricating viscosity, and a minor amount of one or more neutral and/overbased metal-containing detergents, wherein from about 50% to 100% of the one or more detergents are phenate and/or salicylate detergents.

10. The heavy duty diesel engine of claim 9, wherein from about 50% to 100% of the one or more detergents are phenate detergents.

11. The heavy duty diesel engine of claim 9, wherein the lubricating oil composition further comprises a minor amount of one or more high molecular weight polymers comprising (i) copolymers of hydrogenated poly(monovinyl aromatic hydrocarbon) and poly (conjugated diene), wherein the hydrogenated poly(monovinyl aromatic hydrocarbon) segment comprises at least about 20 wt. % of the copolymer; (ii) olefin copolymers containing alkyl or aryl amine, or anide groups, nitrogen-containing heterocylclic groups or ester linkages and/or (iii) acrylate or alkylacrylate copolymer derivatives having dispersing groups.

12. The heavy duty diesel engine of claim 11, wherein said oil of lubricating viscosity has a saturates content of at least 75%, and said one or more high molecular weight polymers comprises a hydrogenated styrene-isoprene block copolymer.

13. The heavy duty diesel engine of claim 9, wherein the lubricating oil composition further comprises a minor amount of one or more nitrogen-containing dispersants wherein greater than 50 wt. % of the dispersant nitrogen is non-basic.

14. The heavy duty diesel engine of claim 13, wherein said nitrogen-containing dispersant is a reaction product of a polyalkenyl succinimide and a capping agent selected from the group consisting of tautomeric acetoacetate, formalin, formic acid, epoxides, acrylonitrile, glycolic acid, carbonates, e.g., ethylene carbonate) maleic anhydride and succinic anhydride.

15. The heavy duty diesel engine of claim 14, wherein said capping agent is selected from ethyl acetoacetate, ethylene carbonate, formalin, formic acid and epoxide.

16. A heavy duty diesel engine provided with an exhaust gas recirculation system in which intake air and/or exhaust gas recirculation streams are cooled to below the dew point for at least 10% of the time said engine is in operation, said engine being lubricated with a lubricating oil composition comprising a major amount of oil of lubricating viscosity, and a minor amount of one or more nitrogen-containing dispersants wherein greater than 50 wt. % of the dispersant nitrogen is non-basic.

17. The heavy duty diesel engine of claim 16, wherein the lubricating oil composition further comprises a minor amount of one or more high molecular weight polymers comprising (i) copolymers of hydrogenated poly(monovinyl aromatic hydrocarbon) and poly (conjugated diene), wherein the hydrogenated poly(monovinyl aromatic hydrocarbon) segment comprises at least about 20 wt. % of the copolymer; (ii) olefin copolymers containing alkyl or aryl amine, or amide groups, nitrogen-containing heterocylclic groups or ester linkages and/or (iii) acrylate or alkylacrylate copolymer derivatives having dispersing groups.

18. The heavy duty diesel engine of claim 16, wherein the lubricating oil composition further comprises a minor amount of one or more neutral and/overbased metal-containing detergents, wherein from about 50% to 100% of the one or more detergents are phenate and/or salicylate detergents.

19. The heavy duty diesel engine of claim 16, wherein said nitrogen-containing dispersant is a reaction product of a polyalkenyl succinimide and a capping agent selected from the group consisting of tautomeric acetoacetate, formalin, formic acid, epoxides, acrylonitrile, glycolic acid, carbonates, e.g., ethylene carbonate) maleic anhydride and succinic anhydride.

20. The heavy duty diesel engine of claim 19, wherein said capping agent is selected from ethyl acetoacetate, ethylene carbonate, formalin, formic acid and epoxide.

21. A method of operating a heavy duty diesel engine provided with an exhaust gas recirculation system in which intake air and/or exhaust gas recirculation streams are cooled to below the dew point for at least 10% of the time said engine is in operation, for at least 15,000 without a change of lubricating oil, which method comprises lubricating said engine with a lubricating oil composition comprising a major amount of oil of lubricating viscosity, and a minor amount of one or more high molecular weight polymers comprising (i) copolymers of hydrogenated poly (monovinyl aromatic hydrocarbon) and poly (conjugated diene), wherein the hydrogenated poly(monovinyl aromatic hydrocarbon) segment comprises at least about 20 wt. % of the copolymer; (ii) olefin copolymers containing alkyl or aryl amine, or amide groups, nitrogen-containing heterocylclic groups or ester linkages and/or (iii) acrylate or alkylacrylate copolymer derivatives having dispersing groups.

22. The method of claim 21, wherein the lubricating oil composition further comprises a minor amount of one or more neutral and/overbased metal-containing detergents, wherein from about 50% to 100% of the one or more detergents are phenate and/or salicylate detergents.

23. The method of claim 21, wherein from about 50% to 100% of the one or more detergents are phenate detergents.

24. The method of claim 21, wherein said oil of lubricating viscosity has a saturates content of at least 75%, and said one or more high molecular weight polymers comprises a hydrogenated styrene-isoprene block copolymer.

25. The method of claim 24, wherein said one or more high molecular weight polymers comprises a mixture of from about 10 to about 90 wt. % of a hydrogenated styrene-isoprene block copolymer, and from about 10 to about 90 wt. % of an olefin copolymer.

26. The method of claim 21, wherein the lubricating oil composition further comprises a minor amount of one or more nitrogen-containing dispersants wherein greater than 50 wt. % of the dispersant nitrogen is non-basic.

27. The method of claim 26, wherein said nitrogen-containing dispersant is a reaction product of a polyalkenyl succinimide and a capping agent selected from the group consisting of tautomeric acetoacetate, formalin, formic acid, epoxides, acrylonitrile, glycolic acid, carbonates, e.g., ethylene carbonate) maleic anhydride and succinic anhydride.

28. The method of claim 27, wherein said capping agent is selected from ethyl acetoacetate, ethylene carbonate, formalin, formic acid and epoxide.

29. A method of operating a heavy duty diesel engine provided with an exhaust gas recirculation system in which intake air and/or exhaust gas recirculation streams are cooled to below the dew point for at least 10% of the time said engine is in operation, for at least 15,000 without a change of lubricating oil, which method comprises lubricating said engine with a lubricating oil composition comprising a major amount of oil of lubricating viscosity, and a minor amount of one or more neutral and/overbased metal-containing detergents, wherein from about 50% to 100% of the one or more detergents are phenate and/or salicylate detergents.

30. The method of claim 29, wherein from about 50% to 100% of the one or more detergents are phenate detergents.

31. The method of claim 29, wherein the lubricating oil composition further comprises a minor amount of one or more high molecular weight polymers comprising (i) copolymers of hydrogenated poly(monovinyl aromatic hydrocarbon) and poly (conjugated diene), wherein the hydrogenated poly(monovinyl aromatic hydrocarbon) segment comprises at least about 20 wt. % of the copolymer; (ii) olefin copolymers containing alkyl or aryl amine, or amide groups, nitrogen-containing heterocylclic groups or ester linkages and/or (iii) acrylate or alkylacrylate copolymer derivatives having dispersing groups.

32. The method of claim 31, wherein said oil of lubricating viscosity has a saturates content of at least 75%, and said one or more high molecular weight polymers comprises a hydrogenated styrene-isoprene block copolymer.

33. The method of claim 29, wherein the lubricating oil composition further comprises a minor amount of one or more nitrogen-containing dispersants wherein greater than 50 wt. % of the dispersant nitrogen is non-basic.

34. The method of claim 33, wherein said nitrogen-containing dispersant is a reaction product of a polyalkenyl succinimide and a capping agent selected from the group-consisting of tautomeric acetoacetate, formalin, formic acid, epoxides, acrylonitrile, glycolic acid, carbonates, e.g., ethylene carbonate) maleic anhydride and succinic anhydride.

35. The method of claim 34, wherein said capping agent is selected from ethyl acetoacetate, ethylene carbonate, formalin, formic acid and epoxide.

36. A method of operating a heavy duty diesel engine provided with an exhaust gas recirculation system in which intake air and/or exhaust gas recirculation streams are cooled to below the dew point for at least 10% of the time said engine is in operation, for at least 15,000 without a change of lubricating oil, which method comprises lubricating said engine with a lubricating oil composition comprising a major amount of oil of lubricating viscosity, and a minor amount of one or more nitrogen-containing dispersants wherein greater than 50 wt. % of the dispersant nitrogen is non-basic.

37. The method of claim 36, wherein the lubricating oil composition further comprises a minor amount of one or more high molecular weight polymers comprising (i) copolymers of hydrogenated poly(monovinyl aromatic hydrocarbon) and poly (conjugated diene), wherein the hydrogenated poly(monovinyl aromatic hydrocarbon) segment comprises at least about 20 wt. % of the copolymer; (ii) olefin copolymers containing alkyl or aryl amine, or amide groups, nitrogen-containing heterocylclic groups or ester linkages and/or (iii) acrylate or alkylacrylate copolymer derivatives having dispersing groups.

38. The method of claim 36, wherein the lubricating oil composition further comprises a minor amount of one or more neutral and/overbased metal-containing detergents, wherein from about 50% to 100% of the one or more detergents are phenate and/or salicylate detergents.

39. The method of claim 36, wherein said nitrogen-containing dispersant is a reaction product of a polyalkenyl succinimide and a capping agent selected from the group consisting of tautomeric acetoacetate, formalin, formic acid, epoxides, acrylonitrile, glycolic acid, carbonates, e.g., ethylene carbonate) maleic anhydride and succinic anhydride.

40. The method of claim 39, wherein said capping agent is selected from ethyl acetoacetate, ethylene carbonate, formalin, formic acid and epoxide.

* * * * *

UNITED STATES PATENT AND TRADEMARK OFFICE
CERTIFICATE OF CORRECTION

PATENT NO.   : 6,715,473 B2
DATED        : April 6, 2004
INVENTOR(S)  : Ritchie et al.

It is certified that error appears in the above-identified patent and that said Letters Patent is hereby corrected as shown below:

Column 3,
Lines 4, 29 and 54, after "15,000" insert -- miles --.

Column 8,
Line 46, delete "bas" and insert -- basis --.

Column 29,
Lines 3 and 49, after "15,000" insert -- miles --.

Column 30,
Line 29, after "15,000" insert -- miles --.

Signed and Sealed this

Twelfth Day of October, 2004

JON W. DUDAS
*Director of the United States Patent and Trademark Office*